Figure 1:
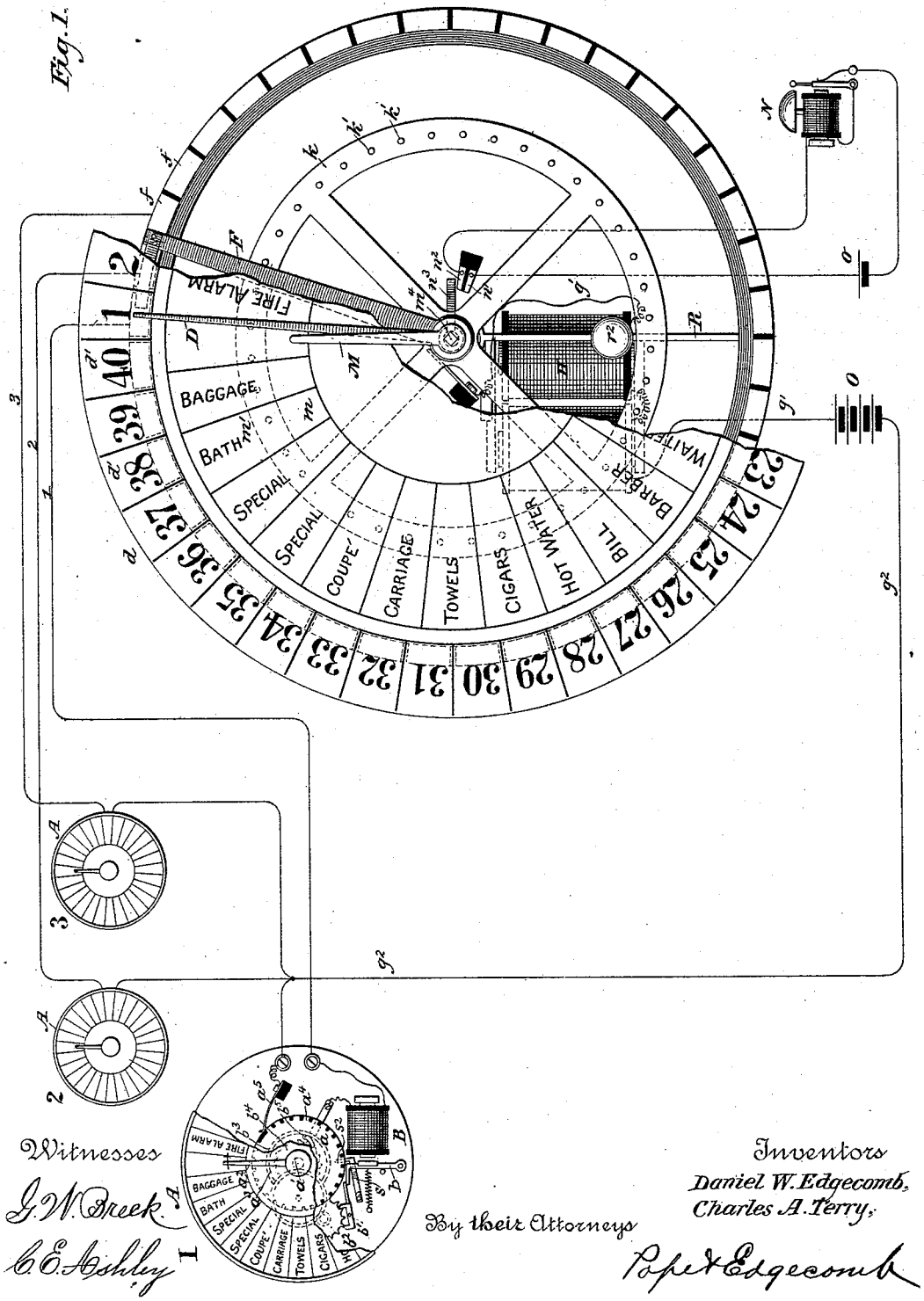

(No Model.) 3 Sheets—Sheet 1.

D. W. EDGECOMB & C. A. TERRY.
ELECTRIC INDICATOR.

No. 414,879. Patented Nov. 12, 1889.

Witnesses
J. W. Breek.
C. E. Ashley.

Inventors
Daniel W. Edgecomb,
Charles A. Terry,
By their Attorneys
Pope & Edgecomb (No Model.) 3 Sheets—Sheet 2.
D. W. EDGECOMB & C. A. TERRY.
ELECTRIC INDICATOR.
No. 414,879. Patented Nov. 12, 1889.
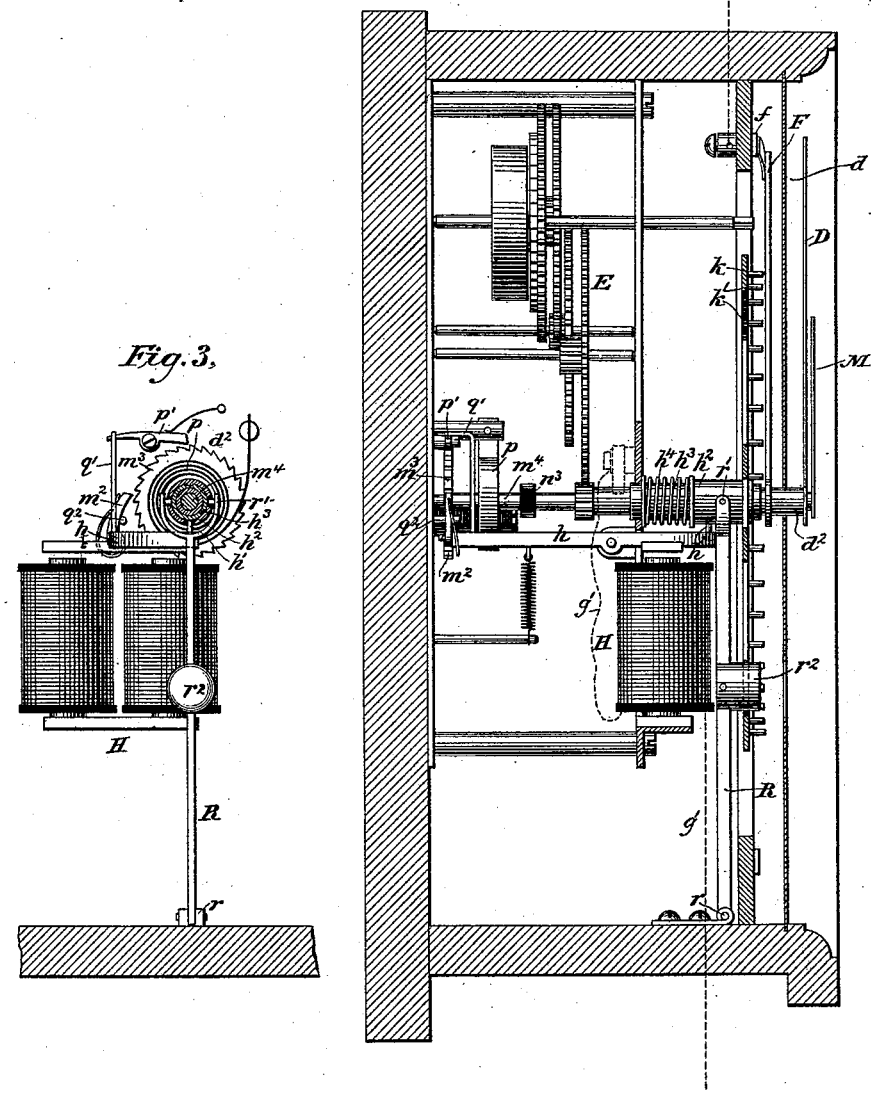
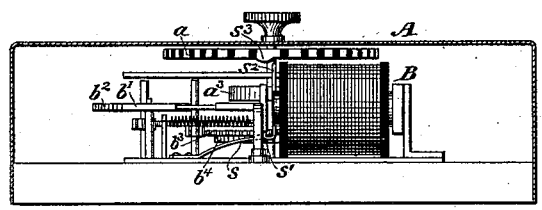
Witnesses
Geo. W. Breck
Carrie E. Ashley
Inventors
Daniel W. Edgecomb,
Charles A. Terry,
By their Attorneys
Pope & Edgecomb (No Model.) 3 Sheets—Sheet 3.

D. W. EDGECOMB & C. A. TERRY.
ELECTRIC INDICATOR.

No. 414,879. Patented Nov. 12, 1889.

Witnesses
Geo. W. Breck.
Carrie E. Ashley

Inventors
Daniel W. Edgecomb,
Charles A. Terry,
By their Attorneys
Pope & Edgecomb

UNITED STATES PATENT OFFICE.

DANIEL W. EDGECOMB, OF NEW YORK, AND CHARLES A. TERRY, OF WHITESTONE, ASSIGNORS TO THE PORTER ELECTRIC MESSENGER COMPANY, OF NEW YORK, N. Y.

ELECTRIC INDICATOR.

SPECIFICATION forming part of Letters Patent No. 414,879, dated November 12, 1889.

Application filed October 8, 1885. Serial No. 179,329. (No model.)

*To all whom it may concern:*

Be it known that we, DANIEL W. EDGECOMB and CHARLES A. TERRY, citizens of the United States, residing, respectively, in New York, in the county and State of New York, and in Whitestone, in the county of Queens and State of New York, have invented certain new and useful Improvements in Electric Indicators, of which the following is a specification.

Our invention relates to the class of apparatus employed for causing the various wants which may require attention at different more more or less remote points to be indicated at a central station—such, for instance, as a hotel-office—from which the wants are to be served.

The object of the invention is to provide reliable, simple, and efficient means for transmitting the required signals to the central office, insuring that the signals shall be received in their proper order, and that one signal or call shall be attended to before another is received.

In carrying out the invention there is placed at each of the signaling-points— the rooms of a hotel, for instance—a transmitter capable of being placed in any of a number of different positions to indicate the wants. Conductors lead from the several transmitters to corresponding contact-plates at the office, and over these a contact-arm is caused to pass in succession. The contact-arm is connected with one pole of a battery, the other pole of which is connected with all the transmitting devices, either directly or through the earth. The battery is connected with each of the contact-plates once during each revolution of the contact-arm; but the circuit is not completed through the corresponding transmitter except when the transmitter has been set for a given signal. In other words, each circuit is normally open at two points, one of which is closed by the act of setting the transmitter and the other by the circuit-closing arm at the office coming into contact with the corresponding contact-plate. When any circuit has thus become complete, a locking device is automatically released at the office, which stops the circuit-closing arm while still in contact with the plate, and at the same time the transmitter commences to operate. This operates to interrupt and complete the circuit a number of times, dependent upon the signal to be given, and returns to its point of rest, again interrupting the circuit. An indicator-arm moving with the contact-arm serves to point out upon a dial the number of the room from which the signal is sent, and a second indicator is operated by the impulses and is moved over a "want-dial" step by step thereby. The room-indicator and the want-indicator remain at the points in which they have been thus automatically placed until the attendant, by pressing a button or in other convenient manner, releases the circuit-closing arm and at the same time allows the want-indicator to return to its starting or zero point.

There are various modifications which may be made in the organization of the apparatus adopted in carrying out the invention without departing from the general principles.

Figure 5:
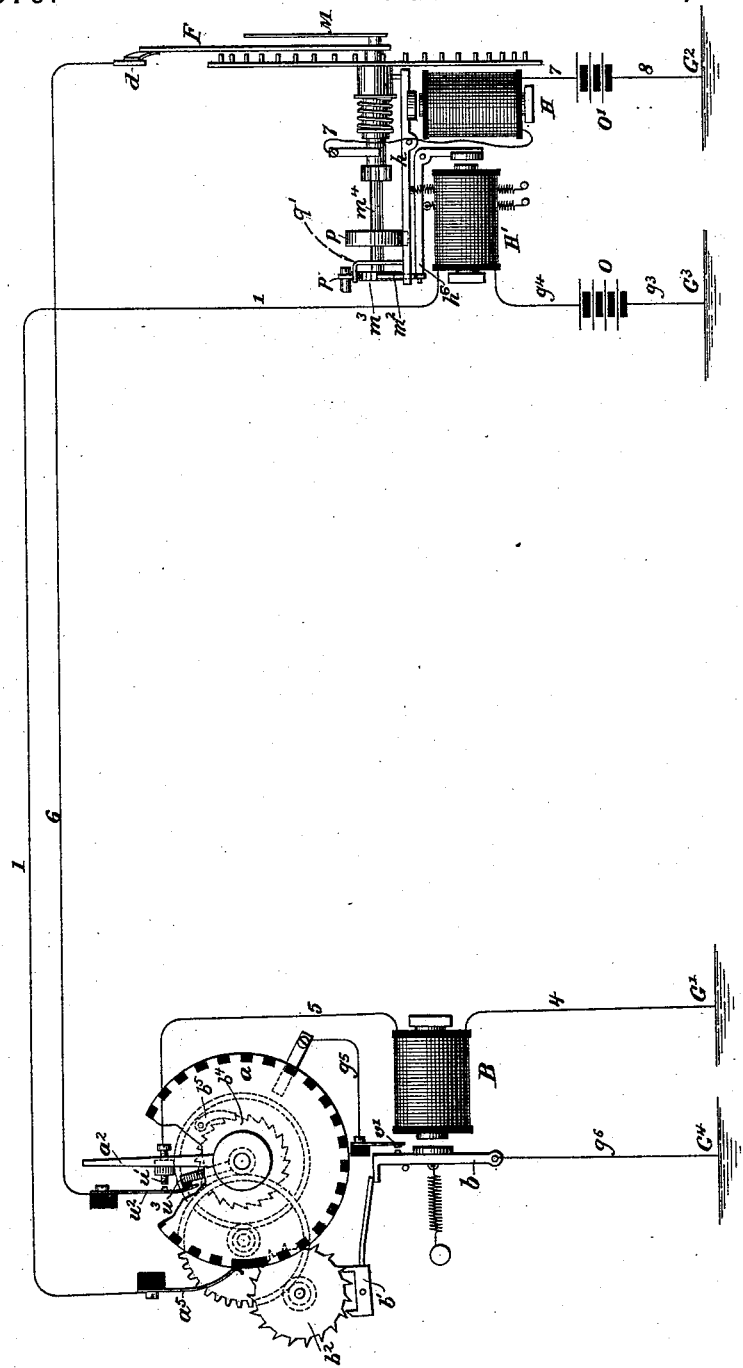

In the accompanying drawings, Figure 1 is a front view, partly in section, of the receiving-instrument or indicator and of the transmitter, showing, also, in diagram, the circuit-connections. Fig. 2 is a side view of the receiver, also partly in section. Fig. 3 illustrates certain details in the construction of the latter. Fig. 4 is a side view of a transmitter. Fig. 5 is a diagram illustrating a modification in the organization of circuits.

Referring to the figures, a description will first be given of the transmitters, all of which are alike and one of which is to be placed in each room, for instance, of a hotel.

A represents the front of a suitable containing-box upon which the different calls or wants are printed. A circuit-controlling wheel $a$ upon an arbor $a'$ is designed to be turned in the direction of the arrow by an arm or crank $a^2$ and at the same time wind a spring $a^3$. The wheel is locked in whatever position it is placed by the armature-lever $b$ of an electro-magnet B intercepting the path of an escapement-anchor $b'$. The anchor is applied to a scape-wheel $b^2$, which is geared with a toothed wheel $b^3$ upon the arbor $a'$, and with said arbor through a ratchet $b^4$ and pawl $b^5$. These permit the crank to be turned forward to set the transmitter, but prevent it from returning until the anchor is released. This is accomplished by vitalizing the electro-magnet at the proper time and thereby withdrawing the lever from the path of the anchor. The circuit-controlling or break wheel $a$ then moves gradually back to its starting-point under the influence of the spring, its movement being retarded as desired. The break-wheel is constructed with circuit-closing points $a^4$, which successively make contact with a contact-brush $a^5$. When the wheel is at its point of rest, an insulating-point or a space between the teeth or projections is beneath the brush, so that circuit-connections are not then established. The crank itself points out the wants which will be signaled when it is placed in any position. The projections of the break-wheel are preferably so related that for each contact made with the brush the crank will move across one of the wants indicated upon the dial. The return of the crank to its starting-point is in itself an indication to the person calling that his call is being received, for the transmitter remains locked until the receiving device releases it, and this is done automatically without the further intervention of the caller or of the clerk, as will hereinafter appear.

Referring now to the receiving apparatus, it may be premised that the usual annunciator-drops and the electro-magnets required in connection therewith are entirely dispensed with and but one electro-magnet H is employed for causing the room and the want to be indicated, and that no attention is required at the office other than the releasing of the apparatus after a want has been indicated. A dial $d$ is provided with a series of numbers $d'$ representing the rooms containing the different transmitters. A hand or room-indicator D, upon a sleeve or quill $d^2$, is driven over these numbers continuously by a suitable motor E, which may be either mechanical, electric, or hydraulic. The sleeve $d^2$ also carries a circuit-closing arm F, which moves over a series of contact-plates $f$, one plate being provided for each room indicated upon the dial and being connected by a corresponding conductor 1, 2, or 3, &c., with the break-wheel through the corresponding electro-magnet B. The arm F is connected by a conductor $g'$, through the electro-magnet H, with one pole of a battery O. The other pole of this battery is connected through a conductor $g^2$ with all the contact-brushes $a^5$ of the transmitters.

The electro-magnet H is provided with an armature-lever $h$, carrying a pin $h'$. This pin normally enters a hole in a collar $h^2$, surrounding a stationary sleeve or shaft $h^3$, concentric with the sleeve $d^2$, and extends into a corresponding opening in the sleeve $h^3$, thus locking the collar, which is capable of sliding upon the shaft, against the tension of a spring $h^4$. A ring $k$, carrying a series of pins $k'$, equal in number to the rooms upon the dial, is supported from the collar $h^2$, and these are held out of the path of the circuit-closing arm so long as the collar is locked. When the electro-magnet H is vitalized, the collar is forced forward by the spring, and one of the pins immediately intercepts the path of the arm, thus arresting and locking it. The electro-magnet H is thus vitalized when the arm F comes in contact with any plate connected with a transmitting-instrument which has been set to send a signal. The electro-magnet is made to respond quickly, and so lock the arm while it is still in contact with the same plate. The room-indicator hand D is thus brought to rest opposite the number designating the room in which the transmitter is located. The current through the circuit thus completed also causes the electro-magnet B to be vitalized and to release the break-wheel. This electro-magnet may with advantage be constructed to respond somewhat more slowly than the magnet H, though this is not necessary. The movement of the break-wheel immediately causes the circuit to be alternately broken and completed a number of times, dependent upon the position in which the crank $a^2$ has been placed. The armature of the electro-magnet H is thus actuated and this serves to actuate a want-indicator M, extending over a dial $m$, step by step, causing it to pass over as many of a series of wants $m'$ indicated thereon as are passed by the crank during its return to the zero-point.

The armature-lever $h$ carries a driving-pawl $m^2$, which engages the teeth of a wheel $m^3$ and advances it step by step. This wheel is mounted upon an arbor or post $m^4$, which extends through the quill or sleeve $d^2$ and carries the want-indicator M. The want-indicator is thus moved independently of the room-indicator D, and the latter remains at rest. The wants are arranged in a series corresponding to those upon the transmitters, and it is evident that in whatever position the transmitter-crank is placed the indicator M will be caused to stand in a corresponding position when the crank has returned to its zero-point.

For the purpose of calling the attention of the attendant at the office when a call is sent, a vibrating bell N, included in the circuit of a local battery $o$, is provided. It is designed that the circuit of this battery shall be completed just after the indicator M commences to move. In the drawings the terminals of the circuit are represented as being in two contact-plates $n'$ and $n^2$. Upon the arbor $m^4$ there is carried a contact-brush $n^3$, which is adapted to make contact with the two points $n'$ and $n^2$ when the arbor has been moved by the first movement of the armature-lever $h$. The bell therefore rings until the next movement of the arbor, whereupon the brush $n^3$ is carried out of contact with the points. Other methods of operating the same are obvious.

It may be found desirable to employ the first space upon the want-dials for signaling a fire-alarm, and this organization is especially well adapted to such an arrangement, as the alarm-bell will continue to ring so long as the want-indicator stands at this point.

The means whereby the indicator D is released and the indicator M returned to its zero-point are as follows: One end of a spring $p$ is attached to the arbor $m^4$ and the other to a stationary support. This spring is wound by the forward movement of the crank, and tends to return it to its starting-point. A dog $p'$, secured to the frame, prevents the spring from returning the wheel until both the dog and the pawl are thrown out of engagement. This is done when the locking-pin $h'$ is returned into the opening through the shaft $h^3$, for the reason that the further movement of the armature-lever $h$ away from the electro-magnet, which is then allowed, causes the pawl to draw across a pin $q^2$, secured to the frame, while a pin or arm $q'$, carried upon the armature-lever, serves to release the dog, throwing it out of engagement with the wheel.

All that is required to release the arm F and lock the collar $h^2$ is to force the latter back against the tension of the spring $h^4$. An arm R, pivoted at one end to a stationary support $r$, is forked at the other end $r'$, and embraces or is pivoted to the collar $h^2$. An arm $r^2$ extends through the face of the dial, or to some other convenient point where it may be pressed inward, thus forcing back the collar until the locking-pin $h'$ enters the openings and the circuit-closing arm F is released. The latter, together with the indicator D, is immediately moved forward by the motor, while the arm M springs back to its zero-point.

As the electro-magnet B might release its armature and lock the escapement-anchor upon the first interruption of the circuit by the break-wheel, it may be constructed to demagnetize so slowly that the armature will not fall away between the successive impulses, or a locking-spring $s$ may be provided for holding it, when once drawn forward, until it is released by the return of the break-wheel to its starting-point. This is readily accomplished by constructing the spring to press against the armature-lever, and providing a catch $s'$, which projects over it when the lever is drawn to its magnet. An extension $s^2$ of the spring passes beneath the break-wheel, and when the latter reaches its starting-point a cam or projection $s^3$ upon its face presses the spring back and removes the catch from the path of the lever, which again locks the anchor.

In Fig. 5 a system of circuits is illustrated, by means of which the want-indicator is operated by a separate magnet H', included in a circuit which is independent of the circuit including the releasing-magnets B and H.

In this system a conductor 4 leads from the releasing-magnet to the earth at G', and a conductor 5 leads from the other terminal of the magnet-coils to an insulated contact-point $u'$. An insulated spring $u^2$ is held away from this point while the transmitter is at its zero-point by an arm $u^3$ upon the arbor of the break-wheel. When the crank is moved forward, the spring $u$ is allowed to rest against the point $u'$. The spring is connected by a conductor 6 with the contact-point of the series $d$ corresponding to the transmitter. The contact-arm F is connected by a conductor 7, through the coils of the electro-magnet H, with one pole of the battery O', the other pole of which is connected with the earth at $G^2$ by a conductor 8. It will be evident thus that a circuit will be completed for the battery O' through the magnets B and H when a transmitter has been set and the contact-arm F strikes the corresponding plate. The ratchet-wheel and want-indicator are not actuated by the lever of the magnet H in this instance, but by an electro-magnet H' included in the circuit of the battery O. One pole of this battery is connected with the earth at $G^3$ by a conductor $g^3$. The other pole is connected by a conductor $g^4$, through the coil of the magnet H', with the several lines leading to the different rooms. These conductors are connected with contact-brushes $a^5$, applied to the respective break-wheels. The break-wheel $a$ is connected by a conductor $g^5$ with a contact-point $v'$, applied to the armature-lever $b$, which is connected with the earth at $G^4$ by the conductor $g^6$. When the releasing-magnet B is vitalized, the circuit of the battery O will be completed through the corresponding transmitter and the impulses will be sent for actuating the want-indicator. The circuit of the magnet B will remain complete until the transmitter has returned to its zero-point, and therefore the armature-lever $b$ will be held in its forward position independently of the spring-catch employed in the former instance. The driving-pawl $m^2$ for the wheel $m^3$, it will be understood, is carried upon the lever $h^6$ of the electro-magnet H'. The pawl and dog are thrown out of engagement with the wheel by an arm $q'$, carried upon the lever $h$, in the manner described with reference to Figs. 1, 2, and 3.

We claim as our invention—

1. In an electric indicator, the combination, with a series of variable signal-transmitters each having a magnet, of a circuit-closer located at a receiving-station, a series of terminals, also located at the said station, respectively connected with the said transmitters, and all normally in the path of the circuit-closer, and circuit-connections comprising a circuit-closer at each transmitter operated by setting the same, and a line extending therefrom through an appropriate terminal of the receiver and its circuit-closer, the transmitter calling being set in operation by its magnets when the circuit is so closed, substantially as set forth.

2. The combination, substantially as hereinbefore set forth, of one or more circuit-controlling transmitters, each capable of being set in position to make and break the connections of an electric circuit, a contact-plate at a central station corresponding to each transmitter and electrically connected therewith, a contact-arm adapted to periodically make contact with each plate, means for causing any transmitter which has been set to be automatically actuated when the contact-arm touches the corresponding plate, and an indicator also located at the central station and actuated by the operation of the transmitter.

3. The combination, substantially as hereinbefore set forth, of a series of circuit making and breaking transmitters located at different points, a contact-plate corresponding to each transmitter and electrically connected therewith, a contact-arm adapted to be placed in contact with the respective contact-plates, one at a time, means for causing the same to be held in contact with any plate connected with a transmitter which has been placed in position to transmit a signal, a dial, an indicator moving with the contact-arm and indicating at any time upon said dial the particular transmitter which has so caused the arrest of the contact-arm, a second indicator, and means for actuating the same by the operation of said transmitter, said contact-plates, contact-arm, dial, and indicators being located at a central station, and all of the said contact-plates being in the path of the contact-arm.

4. The combination, substantially as hereinbefore set forth, of a battery, a series of circuit making and breaking transmitters, a series of contacts, one for and connected with each transmitter, a continuously-moving contact-arm applied to said contacts and connected with said battery, means for setting any or all of said transmitters in position to complete the connections of an electric circuit from said battery to the corresponding contact and locking it in such position, an electro-magnet vitalized by the contact of said arm with said contact and serving to release said transmitter, means for returning the transmitter to its normal position when so released, and for causing it to make and break the circuit of said battery a number of times, dependent upon the position in which it has been set, an indicator, and means controlled by the impulses thus occasioned for moving said indicator, said contacts, contact-arm, and indicator being located at a central office.

5. The combination, substantially as hereinbefore set forth, of two dials located at a central office, one containing room-designating characters and the other want-designations, two revolving indicators respectively applied thereto, means for causing the room-indicator to normally move continuously above its dial, a series of call-boxes or transmitters located in different rooms, means controlled by the respective boxes for arresting the room-indicator in position to indicate the number of the room containing it, and means operated by the transmitter which has so caused the arrest of the room-indicator for actuating the want-indicator and causing it to stand in any required position.

6. A hotel-annunciator system consisting of a series of contact-plates located at a central office, a revolving circuit-closing arm applied thereto, a room-indicator moving therewith, a locking device for arresting said arm and indicator in any required position, an electro-magnet for causing said locking device to operate, a series of call-boxes located at different points, each capable of being set to transmit a variable number of impulses, dependent upon the want to be answered, and locked in such position, a circuit closed by the combined action of a box so set and said circuit-closing arm through said electro-magnet, thereby causing said indicator to stop in position to designate the box combining therewith to so complete the circuit, means for releasing said box automatically, and a want-indicator advanced step by step by the impulse occasioned by the call-box and serving to point out the want required.

7. In a hotel-annunciator system, a revolving room-indicator, a want-indicator, corresponding concentric dials, a circuit-closing arm moving with the room-indicator, a series of contact-plates, conductors leading therefrom to the respective rooms, a locking device for arresting said arm in contact with any contact-plate, an electro-magnet, its armature-lever normally restraining said locking device, a ratchet-wheel and pawl for advancing said want-indicator actuated by the movements of said lever, a spring wound by the advancement of said want-indicator, means for releasing said contact-arm and throwing said pawl out of engagement with said ratchet-wheel, thereby permitting the room-indicator to advance and the want-indicator to return to its starting-point.

8. The combination, substantially as hereinbefore set forth, in a hotel-annunciator and call system, of a room-indicator, a want-indicator, and concentric dials for the same located at the central office, a series of call-boxes located in the respective rooms, means controlled by any call-box for arresting the room-indicator in position to indicate the room containing the same, means for advancing the want-indicator while the room-indicator is so arrested, and manually-operated mechanism for releasing said room-indicator after the signal has been received and causing the want-indicator to return to its point of rest.

9. The combination, with a series of variable signal-transmitters, each having an indicator, a magnet, and a motor released by the magnet to restore the indicator to its zero position, of a circuit-closer located at a receiving-station, a series of terminals all normally located in the path of the said circuit-closer and respectively connected with the said transmitters, a locating-indicator, also located at the receiving-station and adapted to locate the transmitters, an automatically-started signal-indicator to reproduce the transmitter-signals, and circuit-connections between the transmitters and the said receiving-station, whereby the indicators at such station are controlled, substantially as set forth.

10. The combination, with a series of variable signal-transmitters, each having an indicator, a magnet, and a motor released by the magnet to restore the indicator to its zero position, of a locating-indicator located at a receiving-station and adapted to locate the transmitters, an automatically-started signal-indicator to reproduce the signals to which the transmitters may be set, circuit-connections between the transmitters and the receiving-station, and a rheotome located in such circuit which it interrupts to control the action of the said signal-indicator, substantially as set forth.

11. The combination, with a series of variable signal-transmitters each having an indicator, a circuit-controller, a magnet, and a motor released by the magnet to operate the said indicator and circuit-controller in being restored to their zero positions, of a locating-indicator located at a receiving-station to locate the said transmitters, an automatically-started signal-indicator to reproduce the signals to which the transmitters may be set, circuit-connections between the transmitters and the receiving-station, and a rheotome for interrupting the circuit, whereby the circuit-controllers of the transmitters are called in by the magnets thereof to break the circuit and thus control the signal-indicator, substantially as set forth.

12. The combination, with a series of variable signal-transmitters each having an indicator, a magnet, and a circuit-controller, of a series of terminals located at a receiving-station and respectively connected with the said transmitters, a circuit-closer adapted to successively make contact with the terminals, a locating-indicator connected with the said circuit-closer to locate the transmitters, a magnet-released detent to arrest the circuit-closer, and hence stop the indicator, a signal-indicator to reproduce the signals of the transmitters, a magnet to operate the signal-indicator when the locating-indicator has given its indication, and circuit-connections between the transmitters and the magnets of the said detents, substantially as set forth.

13. The combination, with a series of variable signal-transmitters each having an indicator, a magnet, and a circuit-controller, of a series of terminals located at a receiving-station and respectively connected with the said transmitters, a circuit-closer adapted to successively make contact with the said terminals, a locating-indicator to locate the transmitters, an automatically-started signal-indicator to reproduce the signals of the transmitters, circuit-connections between the trasmitters and the receiving-station, and a rheotome to interrupt the circuit, whereby the circuit-controller of the transmitter calling is called in to break the circuit and the signal-indicator controlled, substantially as set forth.

14. The combination, with a series of variable signal-transmitters, of a series of terminals located at a receiving-station and respectively connected with the transmitters, a circuit-closer to successively make contact with the terminals, which are all normally in the path thereof, a locating-indicator connected with the circuit-closer and locating the transmitters, and automatically-started signal-reproducing mechanism to reproduce the signals of the transmitters, substantially as set forth.

15. The combination, with a series of variable signal-transmitters each having an indicator, a magnet, and a circuit-controller, of a series of terminals located at a receiving-station and respectively connected with the transmitters, a circuit-closer to successively make contact with the terminals, a locating-indicator to locate the transmitters, an automatically-started signal-reproducing mechanism to reproduce the signals of the transmitters, circuit-connections between the transmitters and receiving-station, and a rheotome to interrupt the circuit and call in the circuit-controller of the transmitter calling to change the circuit to its normal condition after the locating-indicator and signal-reproducing mechanism have been operated, substantially as set forth.

16. In an electric indicator, the combination, with a series of variable signal-transmitters, of a circuit-closer switch located at a receiving-station, a series of terminals, all normally located in the path of the said circuit-closer switch and respectively connected with the said transmitters, a locating-indicator to locate the several transmitters, a lock to stop and hold the same, an electro-magnet to operate the said lock, and a signal-indicator to reproduce the signals of the transmitters, having a controlling-magnet in the circuit closed by the circuit-closer switch through one of the terminals, substantially as set forth.

17. In an electric indicator, the combination, with a series of variable signal-transmitters each having an indicator, a circuit-controller and a magnet for operating the same, of a rotatable circuit-closer switch located at a receiving-station, a series of circularly-disposed terminals all normally located in the path of the said circuit-closer switch and respectively connected with the said transmitters, a locating-indicator to locate the several transmitters coupled with the said switch and traveling therewith, a lock to stop the said indicator and switch when the latter has closed a circuit through any one of the terminals, an electro-magnet to operate the said lock and vitalized by the circuit thus completed, and a signal-indicator having a controlling-magnet in the circuit closed by the said switch, as described, substantially as set forth.

In testimony whereof we have hereunto subscribed our names this 2d day of October, A. D. 1885.

DANIEL W. EDGECOMB.
CHARLES A. TERRY.

Witnesses:
CAROLINE E. DAVIDSON,
SIMON M. EHRLICH.